April 4, 1939.  J. E. P. GRANT  2,153,462

SWITCH-ACTUATING MECHANISM

Filed March 31, 1938    8 Sheets-Sheet 1

Inventor:-
John E. P. Grant
by his Attorneys
Howson & Howson

Inventor:
John E. P. Grant
by his Attorneys
Howson & Howson

April 4, 1939.  J. E. P. GRANT  2,153,462

SWITCH-ACTUATING MECHANISM

Filed March 31, 1938  8 Sheets-Sheet 3

Inventor:—
John E. P. Grant
by his Attorneys
Howson & Howson

April 4, 1939.   J. E. P. GRANT   2,153,462
SWITCH-ACTUATING MECHANISM
Filed March 31, 1938   8 Sheets—Sheet 4

Inventor:
John E. P. Grant
by his Attorneys
Howsen Howson

April 4, 1939.   J. E. P. GRANT   2,153,462
SWITCH-ACTUATING MECHANISM
Filed March 31, 1938   8 Sheets-Sheet 5

Inventor:
John E. P. Grant
By his Attorneys
Howson & Howson

April 4, 1939. J. E. P. GRANT 2,153,462
SWITCH-ACTUATING MECHANISM
Filed March 31, 1938 8 Sheets-Sheet 6

Inventor:-
John E. P. Grant
By his Attorneys
Howson Howson

April 4, 1939.  J. E. P. GRANT  2,153,462
SWITCH-ACTUATING MECHANISM
Filed March 31, 1938  8 Sheets-Sheet 7

Inventor:—
John E. P. Grant
By his Attorneys
Howson & Howson

Patented Apr. 4, 1939

2,153,462

UNITED STATES PATENT OFFICE 2,153,462

SWITCH-ACTUATING MECHANISM

John E. P. Grant, Swarthmore, Pa.

Application March 31, 1938, Serial No. 199,254

14 Claims. (Cl. 200—48)

This invention relates to electric switches, and a principal object of the invention is to provide an improved operating mechanism for disconnecting switches that shall be characterized by relative simplicity of form and high efficiency of operation.

Switches of this class conventionally employ elongated switch arms which, when retracted from the operative position, afford a wide gap between the terminal or contact elements of the switch. Manipulation of this relatively long and heavy arm requires an expenditure of considerable power, and in order to reduce to a minimum the force required for operation, and for other reasons hereinafter set forth, it is desirable to disengage the blade, conventionally carried by the arm, from the relatively fixed contact element before the retractive movement of the arm is initiated. This initial disengagement of the blade may be accomplished in a number of different ways, such as for example, by a simple longitudinal retraction, or by a twisting movement of the blade, or by a combination of these two movements. My invention contemplates the provision of novel mechanism, applicable in principle to all types of switches of this general class, which through the medium of toothed gears may effect all the movements of the parts required for normal actuation of the switch.

In the attached drawings, in which I have illustrated several different types of switch belonging to the general class to which this invention relates.

Figure 1:
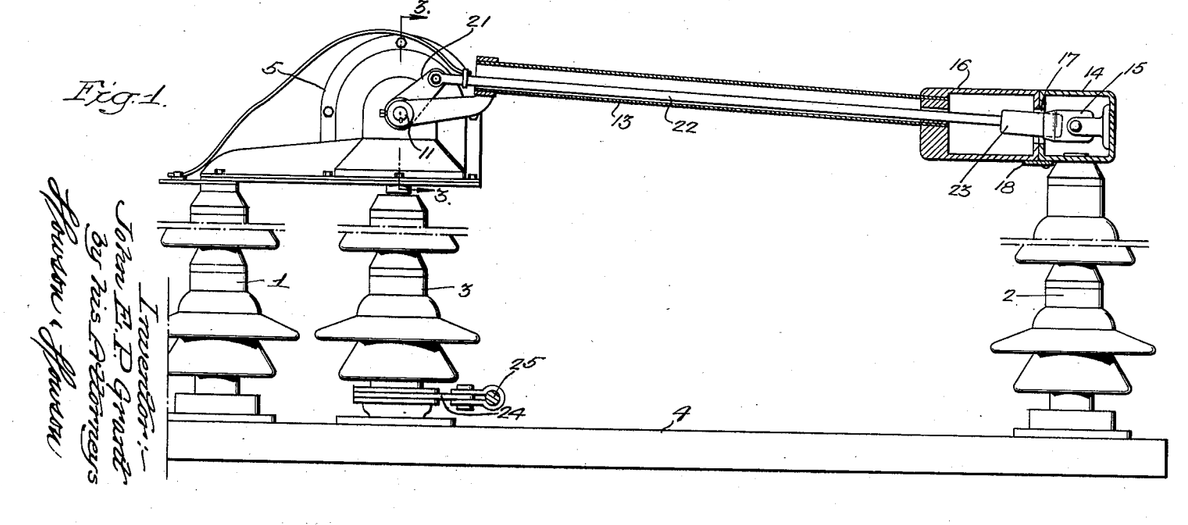
Figure 1 is a side elevational and partial longitudinal sectional view of a three insulator-stack switch made in accordance with my invention.
Figure 2:
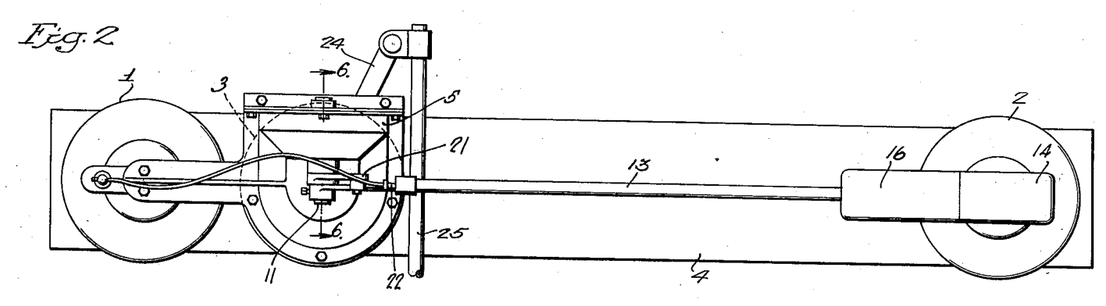
Fig. 2 is a plan view of the switch.
Figure 3:
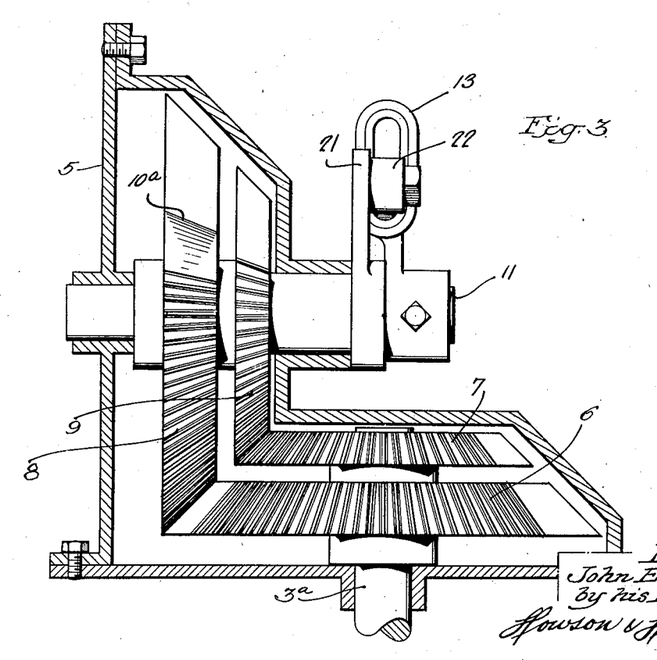
Fig. 3 is a section on the line 3—3, Fig. 1.
Figure 6:
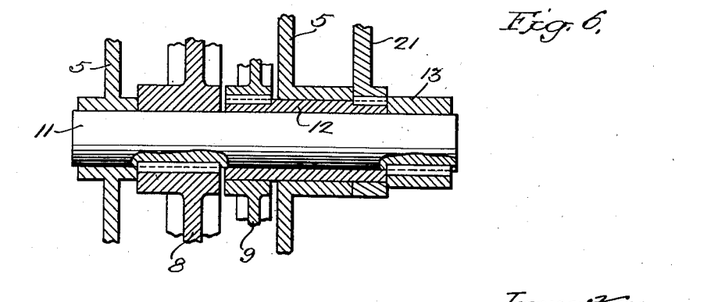
Fig. 6 is a fragmentary sectional view on the line 6—6, Fig. 2.

With reference to Figs. 1 to 6, inclusive, of the drawings, the switch therein disclosed comprises a pair of stationary insulator stacks, 1 and 2 respectively, and an intermediate stack 3 which is capable of rotary movement about its vertical axis, said stacks being mounted in the present instance upon a common base 4. Supported in fixed position upon the stacks 1 and 3 is a casing 5 which houses a gear system, as shown in Fig. 3. The gear system comprises a pair of superimposed bevel gears 6 and 7 secured on the upper end of a drive shaft 3a which projects upwardly from and is rotatable with the stack 3. The gears 6 and 7 are adapted to mesh respectively with gears 8 and 9, the gear 8 being secured as shown in Fig. 6 to an operating shaft 11 journaled in the casing 5. The gear 9, as also shown in Fig. 6, is secured to a second operating shaft in the form of a sleeve 12 which loosely embraces the shaft 11. Both the shaft 11 and the sleeve 12 project through a wall of the casing 5, and on the projecting end of the shaft 11 is secured a hollow switch arm 13. This arm 13, as shown in Figs. 1 and 2, in one angular position of the shaft 11 projects transversely into close proximity to a side wall of a casing 14 supported on the stack 2, this casing housing a contact member 15 constituting one of the terminal elements of the switch proper. The outer end of the arm 13 is provided with a casing 16, the outer end wall of which is adapted to lie in contiguity with a wall of the casing 14, and the proximate walls of the casings 14 and 16 are apertured, as indicated at 17, for a purpose hereinafter set forth. In order to insure proper registration between the casings 14 and 16, the former is provided at the bottom with a projecting flange 18 which forms an abutment or seat for the bottom wall of the casing 16.

To the outer end of the sleeve 12, as shown in Fig. 6, is secured an arm 21, and pivotally secured to the outer end of this arm, see Figs. 1 and 2, is a rod 22 which extends through the hollow arm 13 and which carries at its outer end a blade 23 which is adapted to engage the contact element 15 to close the electric circuit controlled by the switch. When the switch is closed, as shown in Figs. 1 and 2, the blade 23 projects through the registering apertures 17 in the proximate walls of the casings 14 and 16, and is clamped between the resilient arms of the contact member 15. In this position of the blade 23, it is apparent that the arm 13 cannot be elevated from the position in which it is shown, and that such elevation of the arm around the axis of the shaft 11 cannot be effected until the rod 22 is retracted to a position wherein the blade 23 lies entirely within the casing 16, and is, therefore, withdrawn from its normal engagement with the contact member 15. In opening the switch, therefore, the first requirement is to retract the rod 22 to disengage the blade 23 from the contact member 15.

Figure 4:
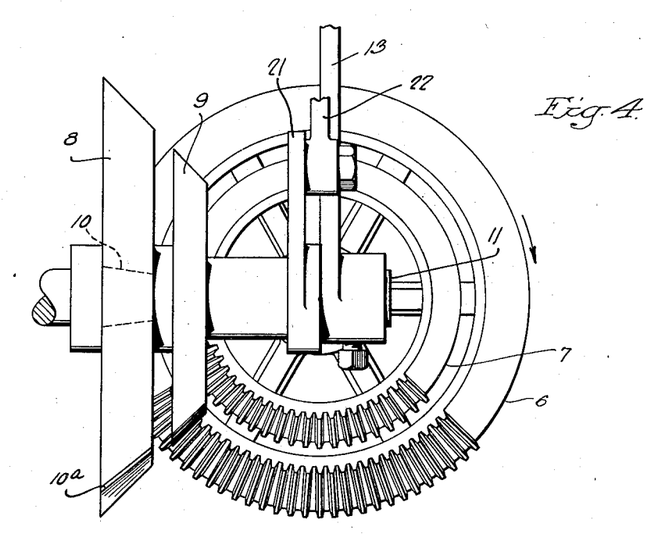
Fig. 4 is a plan view of the element shown in Fig. 3, with the casing removed.
Figure 5:
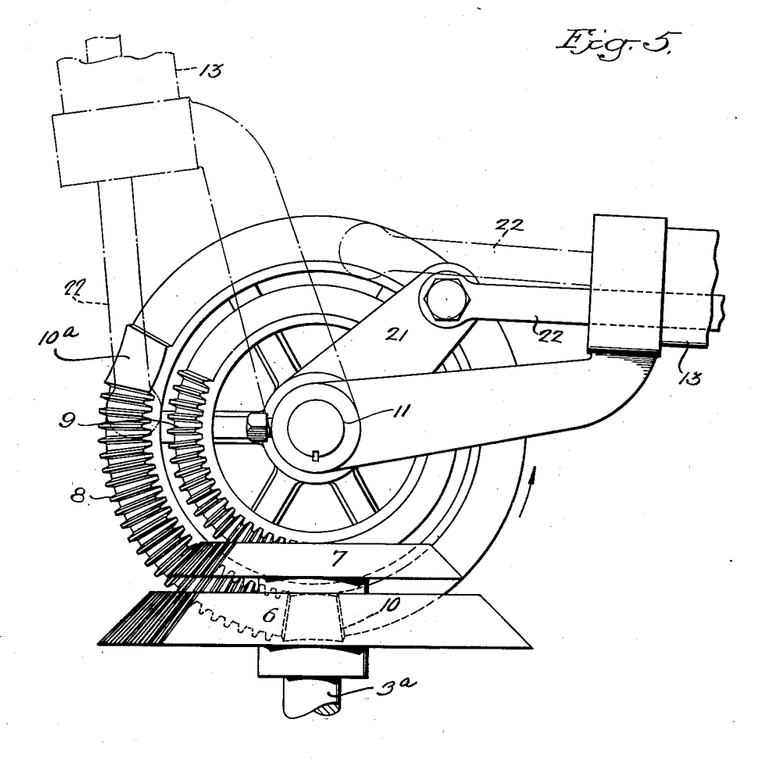
Fig. 5 is a side elevational view of elements of the mechanism shown in Fig. 4.

With reference to Figs. 3, 4 and 5, it will be noted that the gears 6 and 7 are in effect interrupted, the teeth in each instance being restricted to a portion only of the complete circumference of the gear body. The teeth of the gears 8 and 9 may be similarly confined to a portion only of the circumference of those gears. With the switch elements in the closed position, as shown in Figs. 1 and 2, the teeth of the gear 7 are in mesh with the teeth of the gear 9, whereas the teeth of the gear 6 are out of mesh with the teeth of the gear 8. It is apparent, therefore, that the initial rotary movement of the stack 3 and of the gears 6 and 7 in the direction of the arrow in Fig. 4 will result in immediate actuation of the gear 9, but will leave the gear 8 unaffected. In this initial movement of the stack, therefore, the sleeve 12 which carries the gear 9 and the arm 21 will be turned about its axis, whereas the shaft 11 which carries the gear 8 and the arm 13 will remain stationary. This initial movement of the gear 7 acting through the gear 9, the sleeve 12 and the arm 21 is sufficient to longitudinally retract the rod 22 to an extent disengaging the blade 23 from the contact member 15 and withdrawing the blade into the interior of the casing 16 as previously described. When this retractive movement of the rod 22 has been completed, the gear 6 will have been turned sufficiently to bring its teeth into mesh with the teeth of the gear 8, and the continued movement of rotation of the stack 3 will, therefore, result in a joint rotation of the shaft 11 and sleeve 12 and an elevation from its normal operative position of the arm 13. During the elevation of the tubular arm 13, the relative positions of the rod 22 and the arm 13 will remain unchanged, the two moving as a unit about the common axis of the shaft and sleeve. The rotary movement of the stack 3 is continued until the arm 13 has reached the fully retracted position indicated in broken lines in Fig. 5. In the present instance, the rotary movement of the stack 3 is effected through an arm 24 secured as shown in Fig. 1 to the bottom of the stack and a traverse rod 25 which is suitably connected to the outer end of the said arm 24.

In the reverse or closing movement of the switch, the rotational movement of the stack 3 in the opposite direction will cause an initial lowering of the arm 13 into the position in which it is shown in Fig. 1 and a subsequent advancement of the rod 22, bringing the blade 23 again into engagement with the contact element 15.

Referring to Figs. 3, 4 and 5, it will be noted that at each end of the series of teeth on the gear 8, I provide a concaved projection, 10 and 10a respectively, which conforms to the arc of the untoothed beveled surface of the gear 6 and is adapted to fit neatly against the latter. Thus, when the switch elements are in the closed or circuit-forming positions, as shown for example in Fig. 5, the gears 6 and 8 are so relatively positioned that the projection 10 is in engagement with the untoothed portion of the former gear with the result that the gear 8, in effect, is locked in position, whereas the gear 6 is free for rotary movement with the shaft 3a. Under these circumstances, movement of the gear 8, and of the arm 13 to which that gear is connected, can be initiated only by turning the gear 6 to an extent bringing the teeth of that gear into mesh with the teeth of the gear 8. Similarly, when the switch elements are in the fully retracted position, the projection 10a is in engagement with the untoothed portion of the gear 6, so that in this position also the gear 8 and the switch arm are locked in position against movement from any agency except the gear 6. This device not only locks the switch arm both in the closed and retracted positions, so that if desired the switch may be mounted in inverted position without danger of the switch arm moving from those positions by gravity, but also insures continuous operative and synchronized relation between the various gears of the entire set.

Figure 7:
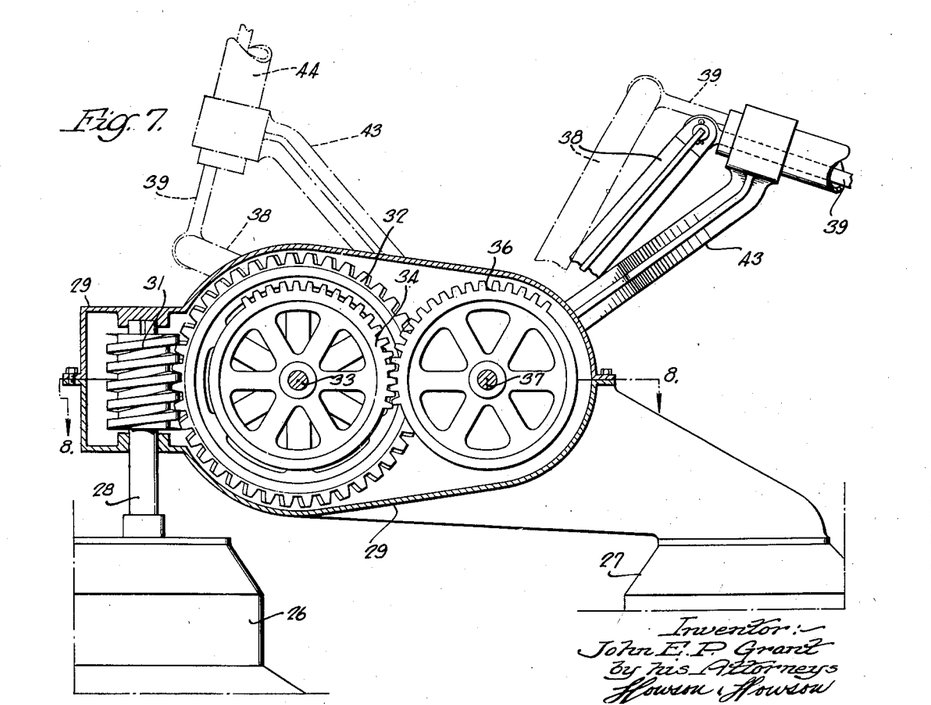
Fig. 7 is a vertical sectional view illustrating a modified form of operating mechanism within the scope of my invention, said section being taken on the line 7—7, Fig. 8.
Figure 8:
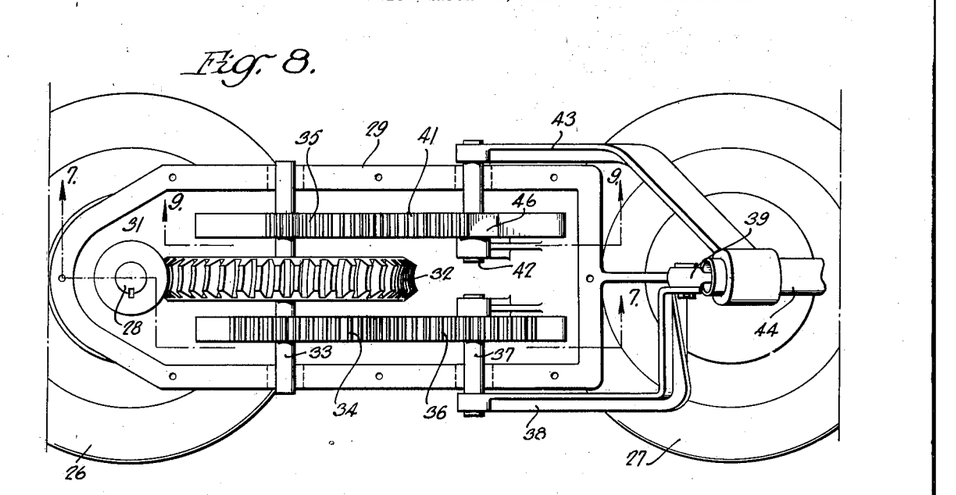
Fig. 8 is a horizontal sectional view of the mechanism shown in Fig. 7 taken on the line 8—8 of the latter figure.

In the embodiment of my invention illustrated in Figs. 7 to 10, inclusive, the switch-operating mechanism is mounted upon insulator stacks 26 and 27, the latter stack in this instance being stationary and the stack 26 being mounted for rotary movement about its vertical axis. From the stack 26 a vertical shaft 28 extends upwardly and into the interior of a casing 29, which is suitably supported upon the stacks. The shaft 28 carries a worm 31 which meshes with a worm wheel 32 carried by and fixed to a shaft 33 journaled, as shown in Fig. 8, in the casing 29. The shaft 33 carries, one at each side of the worm wheel 32, spur gears 34 and 35. The gear 34 meshes with a gear 36 carried by a shaft 37 suitably journaled in the casing and projecting through a wall of the latter. To the outer end of the shaft 37 is secured an arm 38, the outer offset end of which is pivotally connected to an end of a rod 39, this rod corresponding to the rod 22 of the previously described embodiment. The gear 35 meshes with a gear 41 which is carried by a shaft 42 journaled in the casing 29 in axial alignment with the shaft 37, the shaft 42 extending through the opposite wall of the casing 29. Secured to the projecting end of the shaft is an arm 43, and this arm in effect constitutes the terminal portion of a tubular arm 44 which corresponds to the arm 13 of the previously described embodiment.

As illustrated, the gears 34, 36, 35 and 41 are interrupted, but the gears 35 and 41 differ from the other gears in that the latter has at each end of its toothed segment a projection 45 and 46 respectively, the recessed outer faces of which are adapted to fit against the somewhat radially extended untoothed portion of the gear 35, so that when the gears 35 and 41 have been moved to an extent such that the segmental toothed portions thereof pass out of mesh, the gear 41 will be held thereafter stationary, this immobilization of the gear 41 being effected through the medium of the projections 45 and 46 in obvious manner.

Figure 9:
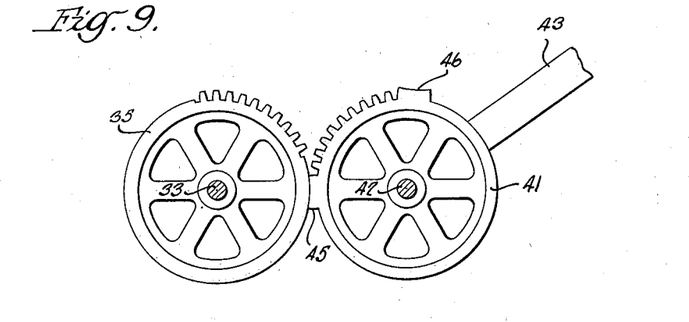
Figs. 9 and 10 are fragmentary sectional views taken on the line 9—9, Fig. 8, showing the elements of the mechanism in different operative positions.

In Figs. 7, 8 and 9 of the drawings, the relative positions of the gears 34, 36, 35 and 41 correspond to the closed position of the switch, it being noted that whereas the teeth of the gears 34 and 36 are meshing with each other, the toothed portion of the gear 35 is out of mesh with the toothed portion of the gear 41. Initial rotation of the shaft 33, therefore, will result in a movement of the gear 36 to the exclusion of the gear 41. In this initial movement of the gear 36, the rod 39 will be drawn longitudinally to the position shown in broken lines in Fig. 7, in which position the blade at the outer end of the rod 39 will be disengaged from its contact member and the electric circuit thereby broken. When the arm 38 has been moved to the fully retracted position, the gear 35 will have advanced sufficiently to bring the toothed portion of that gear into meshed relation with the toothed portion of the gear 41, and continued rotation of the shaft 33 will then result in a retraction of the arm 43—44 to the fully retracted position indicated in broken lines in Fig. 7.

Figure 10:
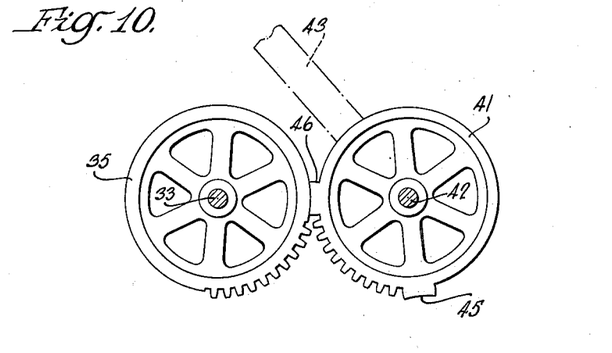

The final position of the gears 35 and 41 is illustrated in Fig. 10, in which it will be noted that the projection 46 on the gear 41 engages the periphery of the untoothed portion of the gear 35. Under these conditions and as previously described, the gear 41 is held stationary and can be moved from the position which it occupies only by action of the gear 35. In its essential mode of operation, the switch illustrated in Figs. 7 to 10, inclusive, is the same as that of the previously described embodiment.

Figure 11:
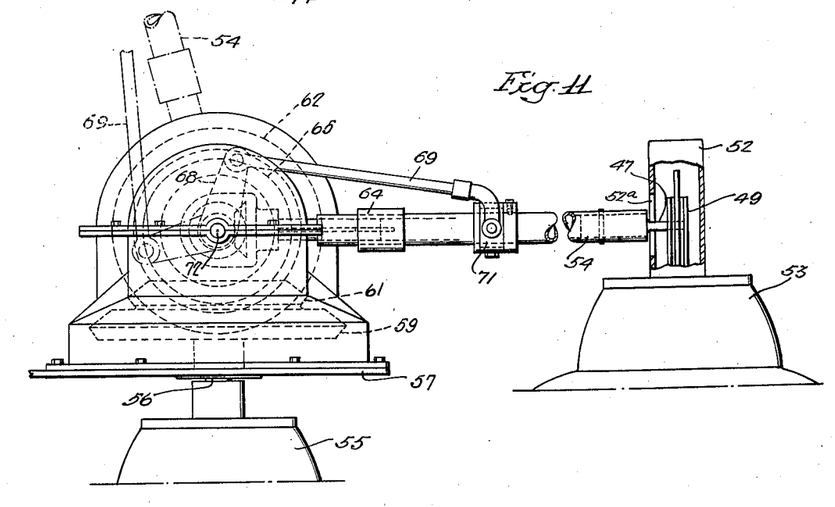
Fig. 11 is a side elevational view of a switch constituting still another embodiment of my invention.

The switch illustrated in Figs. 11 to 16, inclusive, involves a somewhat different mode of operation. In this instance, the electric circuit is closed through the medium of a blade 47, the opposite side edges of which are resiliently engaged and the blade thereby held under transverse compression between resilient arms 48, 48 of a U-shaped contact member 49. The contact member is channeled for reception of a spring 51 which presses the arms of the contact member inwardly against the side edges of the blade 47. As shown in Fig. 11, the contact member 49 is mounted in the interior of a hood 52 upon the upper end of a fixed insulator stack 53; and the blade 47 is carried at the end of an arm 54 which is connected as hereinafter described to switch-actuating mechanism including a rotatable insulator stack 55. Contact between the blade 47 and the contact member 49 is in this case effected by an angular movement of the blade 47 from the position, for example, indicated in broken lines in Fig. 13 to the position shown in full lines, it being noted that in this angular adjustment of the blade the side edges thereof engage and force apart the arms 48, 48 of the contact member. In this case, therefore, it is necessary to provide for this angular movement of the blade 47 in the operating mechanism, as well as for retraction of the blade by longitudinal movement of the supporting arm 54 from the interior of the hood 52, and also for the subsequent elevation of the arm 54 into the fully retracted position indicated by broken lines in Fig. 11.

Figure 14:
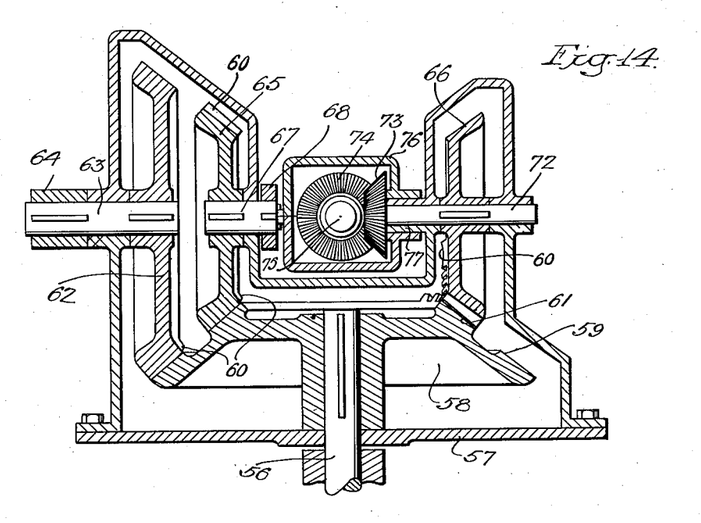
Fig. 14 is a sectional view on the line 14—14, Fig. 12.
Figure 15:
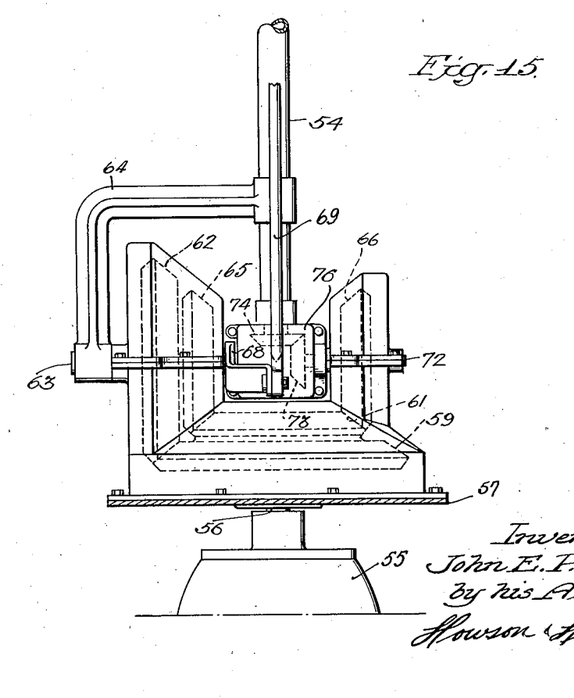
Fig. 15 is an end elevational view of the switch shown in the immediately preceding figures with the switch arm in the elevated position.

Referring now to Fig. 14, it will be noted that a shaft 56 extends upwardly from the top of the rotatable insulator stack 55 and through the bottom wall of a suitably supported fixed casing 57. To the upper end of the shaft 56 is secured a compound bevel gear 58 having two sets of teeth, 59 and 61 respectively. The teeth 59 mesh with a gear 62 secured to the inner end of a shaft 63 journaled in the wall of the casing 57, and the outer end of the shaft 63 carries an arm 64 which on its outer end slidably supports the arm 54. The teeth 61 of the composite gear 58 mesh at opposite sides thereof with bevel gears 65 and 66. The gear 65 is keyed to a shaft 67 journaled in the housing and having secured to its outer end an arm 68, and this arm 68 is connected through a rod 69 and a trunnioned collar 71 with the arm 54, this connection between the rod 69 and the arm 54 being such as to permit rotation of the arm 54 about its longitudinal axis with respect to the rod 69, whereas any longitudinal movement of the rod 69 is transmitted to and translated into a corresponding longitudinal movement of the arm 54. The gear 66 is keyed to a shaft 72 journaled in the casing and having at its inner end a bevel gear 73 which meshes with a gear 74 on the end of a shaft 75, this latter shaft extending into the interior of and having a splined connection with one end of the tubular arm 54. While, therefore, rotary movement of the shaft 75 is transmitted to the arm 54, this latter arm is permitted to slide axially upon the shaft 75. The shaft 75 is journaled in the wall of a casing 76 which is mounted for oscillation upon a cylindrical extension 77 of the casing 57 and about the axis of the shaft 72, whereby the casing 76 is free to move about said axis when the arm 54 is shifted between the operative position, shown in solid lines in Fig. 11, and the retracted or elevated position indicated in broken lines in the same figure. This elevated or retracted position of the arm 54 and the corresponding position of the casing 76 is also illustrated in Fig. 15.

Figure 12:
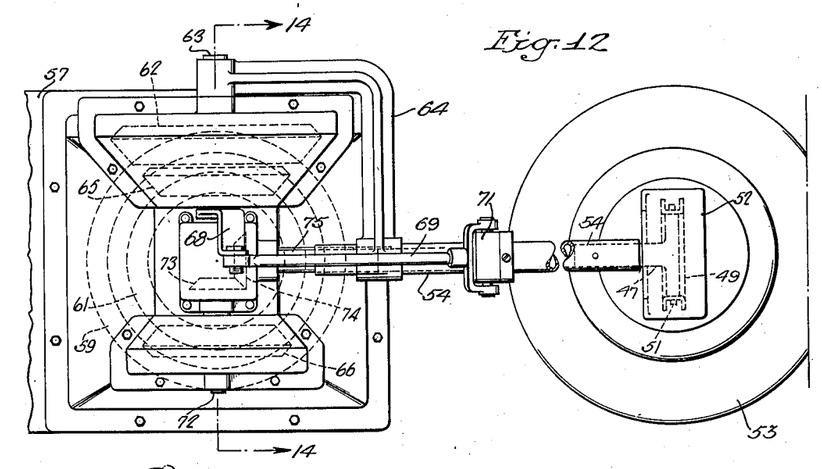
Fig. 12 is a plan view of the switch shown in Fig. 11.
Figure 13:
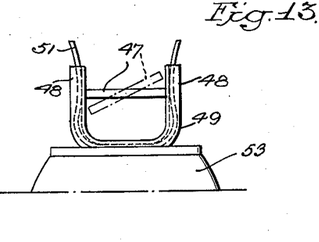
Fig. 13 is a fragmentary view illustrating a detail of the switch mechanism shown in Figs. 11 and 12.
Figure 16:
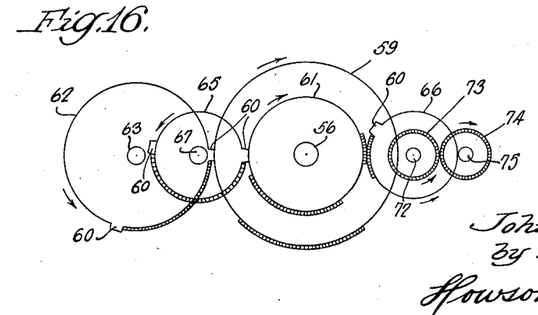
Fig. 16 is a schematic development of the gear train of the switch mechanism illustrated in Figs. 11 to 15, inclusive.

In this case and as shown in the schematic view of Fig. 16, the gears 59, 61, 62, 65 and 66 are not provided with a full complement of teeth extending around the entire peripheries of the gear bodies. In Fig. 16, the relative positions of the gears correspond to the closed or operative position of the switch as illustrated in Figs. 11 and 12, and it will be noted that under these conditions, neither of the gears 61 or 59 is meshed with its cooperating gear 65 and 62, respectively. It will be noted, however, that the gear 66 is meshing with the gear 61. When under these conditions it is desired to adjust the switch into the open or circuit-breaking position, the rotary insulator stack 55 is actuated to turn the gears 61 and 59 in the direction of the arrow, Fig. 16. The initial movement of the gears results only in a corresponding rotation of the gear 66, the gears 65 and 62 remaining stationary. Rotation of the gear 66 acts through the gears 73 and 74 to partially rotate the shaft 75, and this rotary movement of the shaft 75 is transmitted to the arm 54. The angular movement of the shaft 54 under this actuation is sufficient to adjust the blade 47 from its normal position shown in full lines in Fig. 13 to a relatively inclined position as shown in broken lines in the same figure, and it will be noted that this angular movement of the blade is sufficient to break the contact between the edges of the blade and the arms of the contact member 49, thereby breaking the electric circuit.

At the completion of this angular movement of the blade 47, the gear 61 will have moved sufficiently to bring its teeth into mesh with the teeth of the gear 65, and the resulting actuation of the gear 65 will result in a corresponding rotation of the shaft 67 and a movement to the left, as viewed in Figs. 11 and 12, of the arm 68. This movement of the arm through the rod 69 and the connection 71 effects a longitudinal movement of the arm 54 sliding on the shaft 75 sufficient to retract the blade 47 through the aperture 52a in the wall of the housing 52, so that the arm 54 is now in condition to be elevated to the retracted inoperative position indicated in broken lines in Fig. 11. When the blade 47 has cleared the wall of the housing 52, the gear 59 will have advanced sufficiently to bring the teeth of that gear into mesh with the teeth of the gear 62, and the resulting actuation of the latter gear will result in a rotary movement of the shaft 63 and an elevation of the arm 64 connected to that shaft, and connected also as previously described with the arm 54. Elevation of the arm 64, therefore, results in a corresponding movement of the arm 54 about the axis of the shaft 72, and this movement continues until the arm 54 has moved into the fully retracted position shown in Fig. 15.

It will be noted in the operation of the device as described above that after the arm 54 has been adjusted longitudinally to carry the blade 47 clear of the housing 52 and the subsequent initiation of the elevation of the arm 54, the arm 69 moves as a unit with the arm 54 in the movement of this latter arm about an axis corresponding to the axis of the shaft 72, and that, therefore, continued actuation of the gear 65 by the gear 61 does not result in a longitudinal adjustment of the arm 54 upon the shaft 75 beyond that required to carry the blade 47 out of the housing 52.

The sequence of movements of the various parts in the closing operation of the switch is the exact reverse of that described above. In the embodiment of my invention shown in Figs. 11 to 15, inclusive, it will be noted that the axial adjustment of the blade arm 54 is required by use of the housing 52 for the active switch elements. It is apparent that if this housing were eliminated or modified so that such axial retraction of the arm 54 would not be required prior to the swinging of the arm 54 upwardly into the inoperative or retracted position, this requirement for the gear 65 and the immediately associated parts would be avoided, and that these parts might be removed without otherwise affecting the operativeness of the device. In such case in opening the switch, the angular movement of the blade 47 freeing it from contact with the contact member 49 would be followed immediately by an elevation of the arm 54 through the medium of the gears 58 and 62 and the arm 64. In such case also the arm 54 could be secured directly to the gear 74, since the splined connection between the shaft 75 and the arm 54 would not be required.

As in the cases of the previously described embodiments, means is provided in the form of the projections designated in common by the reference numeral 60, for maintaining a proper relation between the interrelated gears and for preventing overhauling of the gears by the switch arm under any condition.

Figures 17, 18, 19, 20:
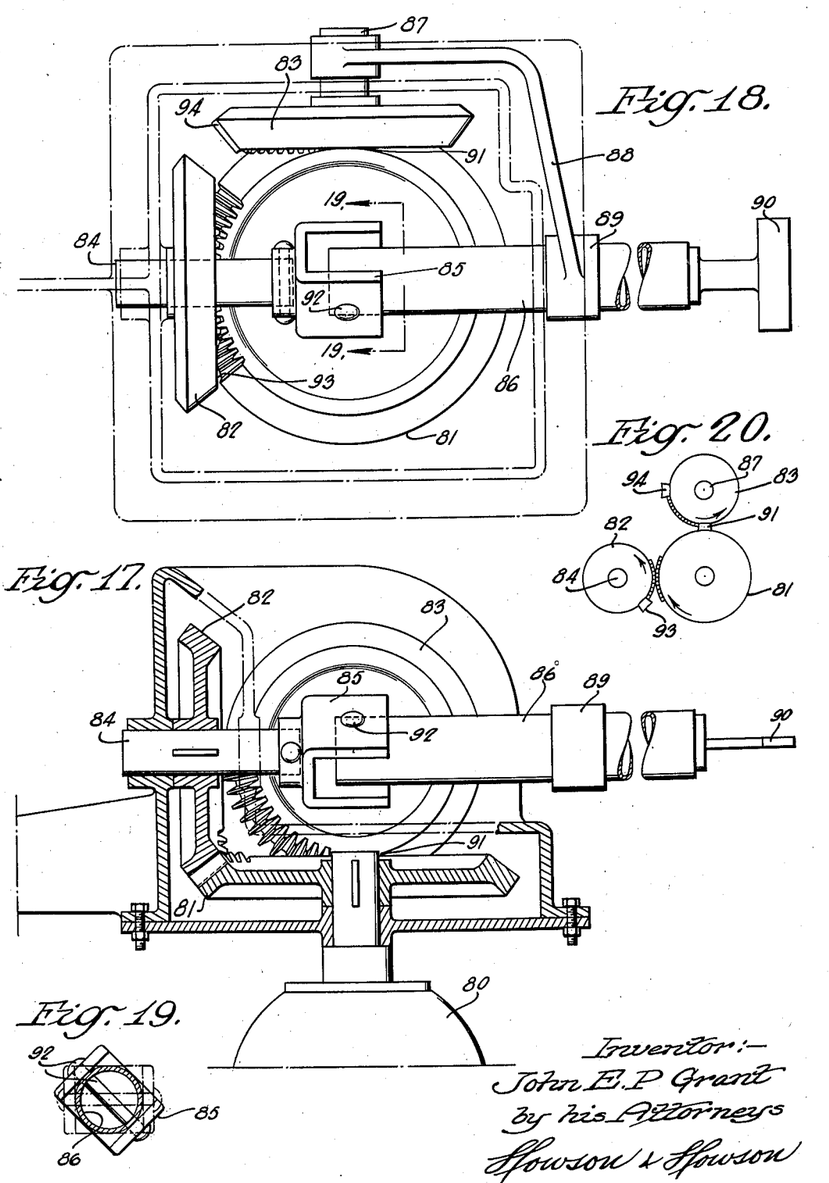
Fig. 17 is a vertical sectional view of still another form of switch-operating mechanism within the scope of my invention.
Fig. 18 is a plan view of the mechanism shown in Fig. 17.
Fig. 19 is a fragmentary sectional view on the line 19—19, Fig. 18.
Fig. 20 is a schematic development of the gear train of the mechanism in Figs. 17 and 18.

The embodiment of my invention shown in Figs. 17 to 20, inclusive, is characterized by its simplicity of form and the relatively few gears employed to produce the compound movement of the switch element. The rotary insulator stack 80 in this case is connected to a gear 81 which is adapted to coact consecutively with gears 82 and 83 arranged at right angles to each other. The gear 82 is keyed to a shaft 84 which carries at its inner end a clevis 85 in which is pivotally secured the switch arm 86. The gear 83 is secured to a shaft 87 to which is also secured an arm 88 having at its outer end a collar 89 loosely embracing the arm 86. At the outer end of the arm 86 is a blade 90 of the same general character as the blade 47 of the previously described embodiment illustrated in Figs. 11, 12 and 13. The gears 81, 82 and 83 are interrupted gears, as illustrated in Fig. 20, which shows these gears in the relative positions which they assume when the switch is closed and when the elements are as shown in Figs. 17 and 18. In this position, the teeth of the gears 81 and 82 are in mesh, while the tooth-free peripheral portion of the gear 81 is in engagement with the locking element 91 of the gear 83 whereby the latter gear is prevented from rotating. It will be noted also that in this position of the elements, the clevis 85, see Fig. 19, is in a position such that the pivot pin 92 which connects the switch arm 86 to the clevis is inclined at an angle of approximately 45°.

The initial movement of the gear 81 in the direction of the arrow shown in Fig. 20 causes a rotation of the gear 82 and of the shaft 84 such that the clevis is rotated toward the position in which it is shown in broken lines in Fig. 19. When the untoothed portion of the gear 81 engages the locking element 93 of the gear 82, the clevis will have assumed the position shown in broken lines in Fig. 19, wherein the pin 92 is in a horizontal position. Further movement in the same direction of the gear 81 brings the teeth of that gear into mesh with the teeth of the gear 83, thereby initiating a rotation of the latter gear which through the shaft 87 and arm 88 moves the arm 86 around the pivot pin 92, and assuming that the switch is mounted in the position illustrated in the drawings will elevate the arm 86. This movement of the arm 86 will continue until the locking element 94 of the gear 83 is engaged by the untoothed peripheral portion of the gear 81. It will be noted that in this compound movement, the switch arm 86 is first turned about its longitudinal axis to thereby angularly move the blade 90 sufficiently to free it from its coacting contact element (not shown), and will thereafter elevate the switch arm and the blade to a fully retracted position. A reverse movement of the gear 81 will first lower the arm 86, and subsequently rock the arm around its longitudinal axis to again engage the switch blade 90 with its companion contact member.

It is to be noted that in each of the various embodiments of my invention herein described, I employ interrupted gear mechanism located at the electrically energized side of the switch for producing the compound relative movements of the switch elements required in switches of the type involved.

It is apparent that still further modification is possible without departure from the principle of the invention as defined in the appended claims.

I claim:

1. In a disconnecting switch of the type requiring successive different movements of at least one of the contact elements in each of the operations of closing and opening the switch, the combination with insulating means for segregating the electrically energized elements of said switch, of switch operating mechanism mounted on said insulating means and at the electrically energized side of the latter and including interrupted gear means for effecting said successive movements, and actuating means for said mechanism at the unenergized side of said insulating means and operatively connected by way of the latter with said mechanism.

2. In a disconnecting switch of the type requiring successive different movements of at least one of the contact elements in each of the operations of closing and opening the switch, the combination with a plurality of insulator stacks supporting the electrically energized elemeans of said switch, of switch operating mechanism mounted on said insulators and at the electrically energized side of the latter and including interrupted gear means for effecting said successive movements, actuating means for said mechanism at the unenergized side of said insulators, and transmission means including one of said insulator stacks for operatively connecting said actuating means with the said mechanism.

3. On the energized side of a disconnecting switch of the type requiring successive different movements of at least one of the contact elements in each of the operations of closing and opening the switch, the combination with an articulated member inclusive of one of said contact elements and comprising relatively movable parts affording said successive movements of said element, of a common drive shaft and independent gear means operatively connecting said shaft with the said movable parts, respectively, for producing said movements, at least one of said gear means being interrupted to afford a delayed operation of one of said parts to thereby effect the successive movements of said element.

4. In a disconnecting switch of the type requiring successive different movements of at least one of the contact elements in each of the operations of closing and opening the switch, the combination with insulating means for segregating the electrically energized elements of said switch, of switch operating mechanism mounted on said insulating means and at the electrically energized side of the latter and including interrupted gear means for effecting said successive movements, and actuating means for said mechanism at the unenergized side of said insulating means and operatively connected by way of the latter with said mechanism, said interrupted gears comprising non-reversible stop means operative to positively lock said contact element against movement except by forces exerted by said actuating means.

5. On the energized side of an electric switch, a switch member comprising relatively movable elements, a common drive shaft, and means for individually operatively connecting said elements with the shaft, at least one of said individual connecting means comprising an interrupted gear affording a delayed actuation of one of said elements by the drive shaft.

6. On the energized side of an electric switch, an operating shaft, a second operating shaft, an arm secured on the first of said operating shafts, a relatively movable switch element supported by said arm and connected to said second shaft, a common drive shaft, and toothed gears connecting said operating shafts individually to said drive shaft, the teeth of at least one of said gears being interrupted to afford a delayed actuation of one of said operating shafts by the drive shaft.

7. In an electric switch, a pair of coaxial operating shafts, an arm secured to one of said shafts, a switch element movably mounted on said arm and operatively connected to the other of said shafts, means including a common drive shaft for turning said operating shafts about their common axis, a set of toothed gears operatively connecting the drive shaft to the first-named operating shaft, and a second set of toothed gears operatively connecting the drive shaft to the second-named operating shaft, at least one of the gears of the first-named set being interrupted whereby a continuous movement in one direction of the drive shaft may effect initially a movement of the switch element with respect to the arm, and a subsequent joint movement of the arm and said element about the common axis of the operating shafts.

8. In an electric switch, a pair of coaxial operating shafts, an arm secured to one of said shafts, a switch element mounted for longitudinal movement on said arm and operatively connected to the other of said shafts, means including a common drive shaft for turning said operating shafts about their common axis, a set of toothed gears operatively connecting the drive shaft to the first-named operating shaft, and a second set of toothed gears operatively connecting the drive shaft to the second-named operating shaft, at least one of the gears of the first-named set being interrupted whereby a continuous movement in one direction of the drive shaft may effect initially a longitudinal movement of the switch element on the arm, and a subsequent joint movement of the arm and said element about the common axis of the respective operating shafts.

9. In an electric switch, a pair of coaxial operating shafts, an arm secured to one of said shafts, a switch element mounted on said arm for rotary movement about the axis of the latter and operatively connected to the other of said shafts, means including a common drive shaft for turning said operating shafts about their common axis, a set of toothed gears operatively connecting the drive shaft to the first-named operating shaft, and a second set of toothed gears operatively connecting the drive shaft to the second-named operating shaft, at least one of the gears of the first-named set being interrupted whereby a continuous movement in one direction of the drive shaft may effect initially a movement of the switch element about the axis of said arm, and a subsequent joint movement of the arm and said element about the common axis of the respective operating shafts.

10. In an electric switch, a plurality of coaxial operating shafts, an arm secured to one of said shafts, a switch element mounted on said arm and adapted for movements both longitudinally of the arm and about the axis of the latter, said switch element being individually operatively connected with two others of said operating shafts, a set of toothed gears operatively connecting the drive shaft to the first-named operating shaft, a second and third set of toothed gears operatively connecting the drive shaft to the two others of said operating shafts respectively, at least one of the gears of the first-named set and of one or the other of the second and third sets being interrupted whereby a continuous movement in one direction of the drive shaft may effect initially a rotary movement of the switch element about the axis of the arm, secondly a longitudinal movement of the switch element with respect to the arm, and subsequently a joint movement of the arm and said element about the common axis of the respective operating shafts.

11. In an electric switch, a plurality of coaxial operating shafts, an arm secured to one of said shafts, a switch element having individual operative connections with two others of said shafts and being mounted on said arm for movements longitudinally of said arm and about the axis of the latter under actuation by the last-named shafts respectively, means for actuating said operating shafts, said means including a common drive shaft and toothed gears individually connecting the operating shafts with the drive shaft, at least two of said individual connections comprising an interrupted gear element whereby a continuous movement in one direction of the drive shaft may effect an initial movement of the switch element about the axis of said arm, a secondary movement of said switch element longitudinally of the arm, and a subsequent joint movement of the arm and said element about the common axis of the operating shafts.

12. On the energized side of an electric switch, an operating shaft, a switch member secured to said shaft for movement about the axis of the latter, a drive shaft, interrupted gear means operatively connecting said shafts and providing for actuation of said operating shaft through a predetermined angle of rotation, said gears comprising means for positively locking said operating shaft at at least one end of said rotational angle against movement by forces other than those applied through the drive shaft.

13. In an electric switch, a pair of operating shafts, an arm secured to one of said shafts, a switch element mounted on said arm for rotary movement about the axis of the latter and operatively connected to the other of said shafts, a common drive shaft for turning said operating shafts, and gear means operatively connecting said drive shaft with the operating shafts, said gear means being interrupted whereby a continuous movement in one direction of the drive shaft may effect initially a movement of the switch element about the axis of said arm under actuation of the second-named operating shaft and a subsequent translational movement of the arm and of said element under actuation of the first-named operating shaft.

14. In an electric switch, a pair of operating shafts, an arm connected to one of said shafts for movement by the latter between two alternative positions of adjustment, means operatively connecting said arm to the other of said shafts for oscillation about a longitudinal axis, a switch element mounted on said arm for movement with the latter, a common drive shaft for turning said operating shafts, and gear means operatively connecting said drive shaft with the operating shafts, said gear means being interrupted whereby a continuous movement in one direction of the drive shaft may effect successive rotary movements of said operating shafts.

JOHN E. P. GRANT.